United States Patent [19]
Di Fulvio et al.

[11] 3,715,117
[45] Feb. 6, 1973

[54] ADJUSTABLE SHEET GUIDE APPARATUS

[75] Inventors: Anthony P. Di Fulvio; William C. Wilson, both of Rochester, N.Y.

[73] Assignee: Eastman Kodak Company, Rochester, N.Y.

[22] Filed: Nov. 5, 1971

[21] Appl. No.: 195,958

[52] U.S. Cl. ....................................271/61, 271/36
[51] Int. Cl. .............................................B65h 1/04
[58] Field of Search..........271/61, 36, 21, 19, 62, 59; 221/242

[56] References Cited

UNITED STATES PATENTS

| | | | |
|---|---|---|---|
| 2,492,577 | 12/1949 | Janke | 271/61 X |
| 2,808,262 | 10/1957 | Keil | 271/61 |
| 3,145,066 | 8/1964 | O'Neal | 221/242 X |
| 3,273,883 | 9/1966 | Baronnie | 271/9 |

Primary Examiner—Harvey C. Hornsby
Assistant Examiner—Bruce H. Stoner, Jr.
Attorney—W. H. J. Kline et al.

[57] ABSTRACT

Document side guides seated on opposite sides of a receiving shelf of a document feeder are spring biased in the longitudinal direction of the receiving shelf so that a wedge-shaped brake pad attached to each of the side guides normally engages a wedge-shaped receiving bracket attached to the underside of the receiving shelf. When the brake pads are disengaged from the wedge-shaped brackets by manually pushing the side guides against the bias of the springs, the side guides are free to move laterally to the extremes of pin slots located in the receiving shelf. When the side guides are released, the springs return the side guides to the wedging mode, thus braking the guides as positioned.

7 Claims, 5 Drawing Figures

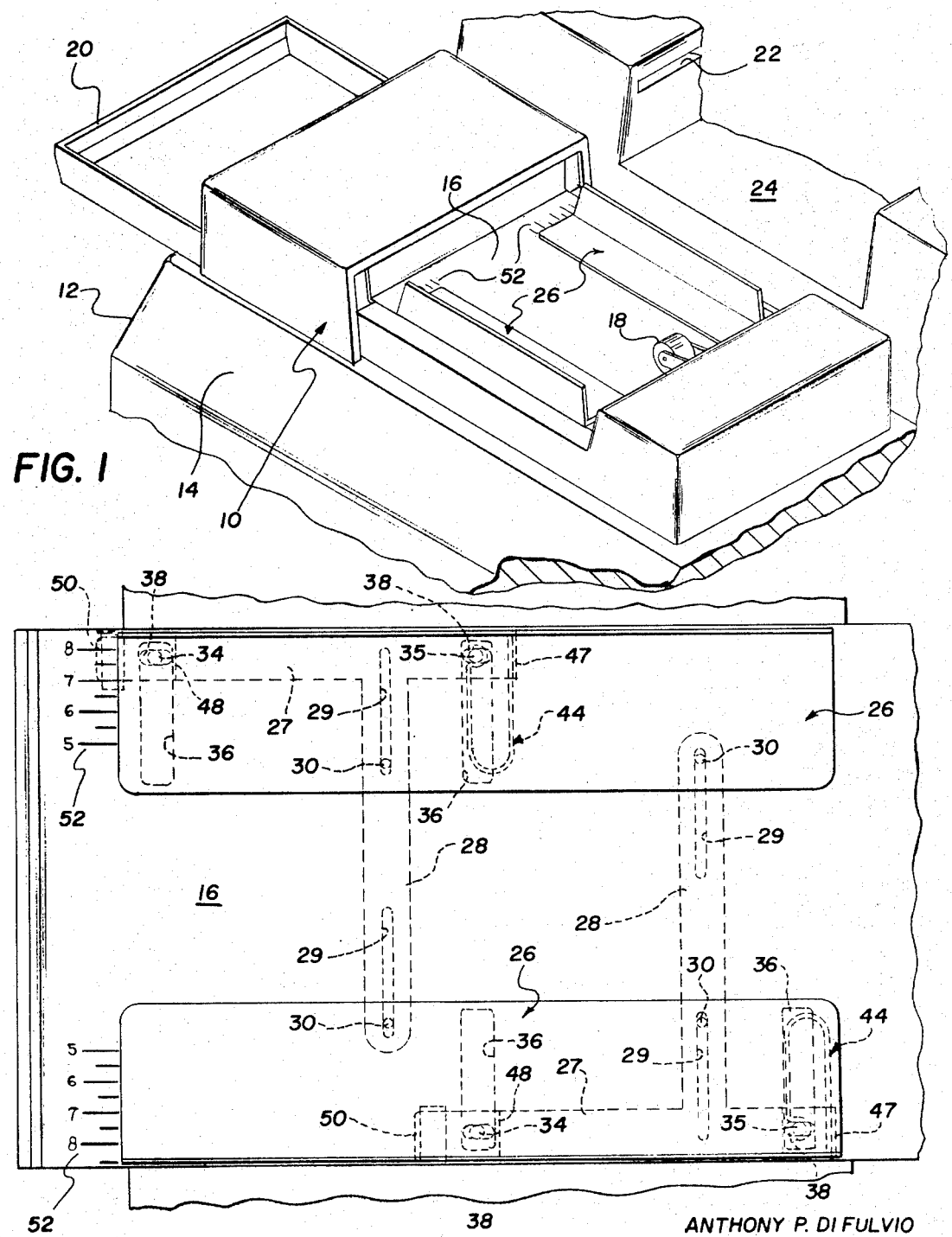

ANTHONY P. DI FULVIO
WILLIAM C. WILSON
INVENTORS

ADJUSTABLE SHEET GUIDE APPARATUS

CROSS REFERENCE TO RELATED APPLICATIONS

Reference is made to commonly assigned U.S. Pat. application Ser. No. 195,988 entitled "Document Feeding Apparatus" filed on even date herewith in the names of Taylor and Brooks.

BACKGROUND OF THE INVENTION

1. Field of the Invention

The invention relates to document handling and feeding apparatus and, more particularly, to apparatus for feeding a series of individual documents from a receiving compartment without skewing.

2. Description of the Prior Art

Automatic copying machines, for example electrophotographic copying machines, wherein a stack of documents to be copied is loaded into a supply or receiving tray of a document feeder and fed seriatim through the exposure area of the copying machine are well known in the art. To enable the copying machine to feed documents of a wide range of size from the receiving tray into the machine without skewing, the receiving tray is frequently provided with document side guides which can be adjusted to suit the size of each stack of documents to be fed. However, many of the document side guide adjusting mechanisms are quite complex which undesirably increases the cost of the copying machine. Other adjusting mechanisms are adjustable to only a limited number of positions. Still other adjustable document guide mechanisms require a large amount of operator time and/or care to complete the adjustment procedure.

SUMMARY OF THE INVENTION

It is therefore the primary object of the invention to provide improved adjustable document side guide apparatus for a document feeder which is of simple design and construction, easy to operate, thoroughly efficient and reliable in operation and economical to manufacture.

This and other objects are accomplished in accordance with the present invention, by providing document side guides which are normally spring biased into a braked position. The side guides are released from their braked position by manually moving them in the document lengthwise direction. When the side guides are held in the released position, they are free to move laterally across the document receiving shelf of the document feeder. Upon release, the side guides are returned by the springs to the braked position.

In a preferred embodiment of the invention, the apparatus includes a pair of document side guides seated on opposite sides of the receiving shelf and a pair of corresponding brackets mounted on the underside of the receiving shelf. Pins secured to each side guide extend downwardly through transverse elongated slots in the receiving shelf and through longitudinal slots in the brackets. A pair of leg springs, each spring having one leg abutting an end portion of a bracket and the opposite leg abutting a downwardly extending pin secured to each side guide, urge the side guides for movement in the path defined by the longitudinal slots of the brackets so that a brake pad attached to each side guide is wedged against a mating end portion on each bracket. When the side guides are manually disengaged from the brackets by pushing the side guides against the bias of the springs, the side guides are free to move to extremes of the transverse elongated slots in the receiving shelf. The side guides are released when they have been moved to the desired lateral position on the receiving shelf and the force of the springs returns them to the wedging mode, thus braking the guides as positioned.

The organization and method of operation of the invention together with further objects and advantages will become more apparent in the detailed description of the preferred embodiment which follows.

BRIEF DESCRIPTION OF THE DRAWINGS

In the detailed description of the preferred embodiment presented below, reference is made to the accompanying drawings wherein corresponding parts are identified by like numerals and in which:

FIG. 1 is a perspective view of a portion of a conventional electrophotographic copying machine, on which portion is mounted a document feeding apparatus embodying the invention;

FIG. 2 is a plan view of the apparatus shown in FIG. 1;

DESCRIPTION OF THE PREFERRED EMBODIMENT

Figure 3:
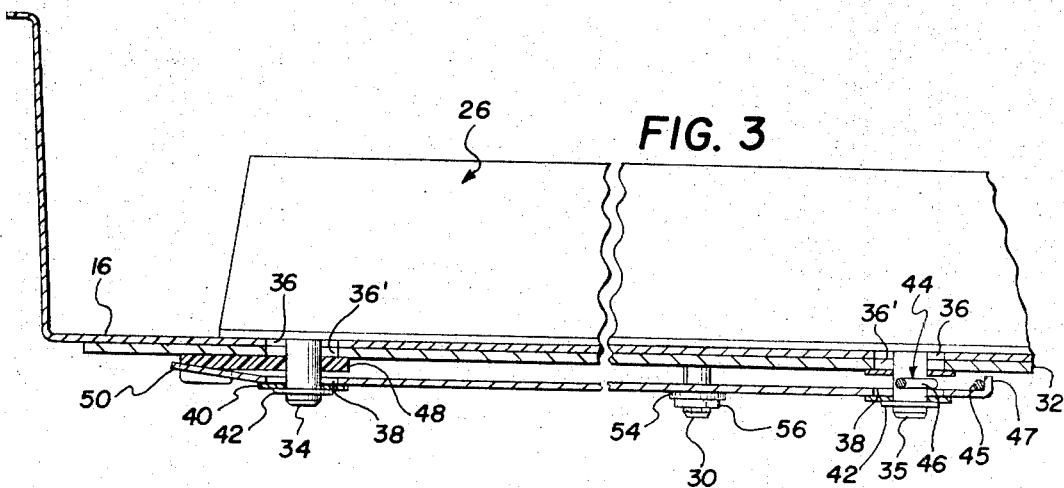
FIG. 3 is a side elevational view showing the apparatus in its braked position.

Referring now to the drawings, and and in particular to FIG. 1, there is shown a document feeder, designated generally by the reference numeral 10, mounted on the frame and housing 12 of a conventional electrophotographic copying machine 14. The document feeder 10 is used in applications in which a plurality of individual documents are to be copied in a programmed sequence. In operation, a stack of documents (not shown) is placed by an operator on the receiving shelf 16 of the document feeder 10 and under a feed roller 18. When energized, the document feeder 10 individually advances each document from the top of the stack through the exposure area (not shown) of the copying machine 14, where an image of the document is projected onto a photosensitive medium (not shown). The image so projected is processed to produce an electrophotographic copy of the document which is subsequently discharged from the copying machine 14 through an outlet 22 onto a receiving shelf 24. After a document has been exposed to the copying machine 14, it is fed to an output receptacle 20. The operation is then repeated until all the documents in the stack have been copied. For a more complete description of the feeding operation of the document feeder 10, reference is made to copending application Ser. No. 195,988 filed on Nov. 5, 1971, in the names of Taylor and Brooks.

To guide documents of widely varying size in proper alignment as they are fed into the transport mechanism (not shown) of the document feeder 10, the document feeder is conveniently provided with a pair of individually adjustable side guides 26 seated on opposite sides of the receiving shelf 16 as shown in FIGS. 1 and 2.

Figure 4:
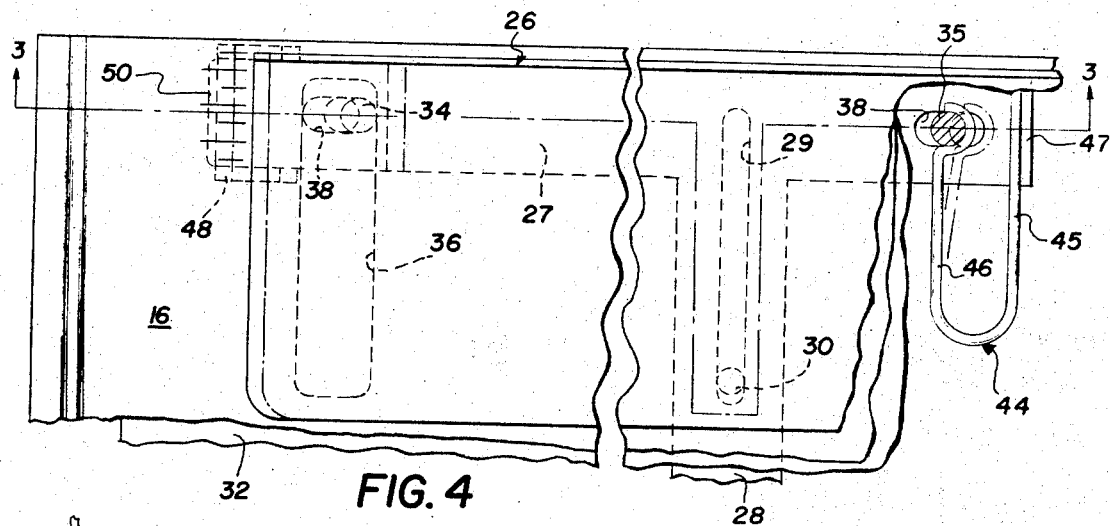
FIG. 4 is a bottom view of the apparatus, partially broken away.
Figure 5:
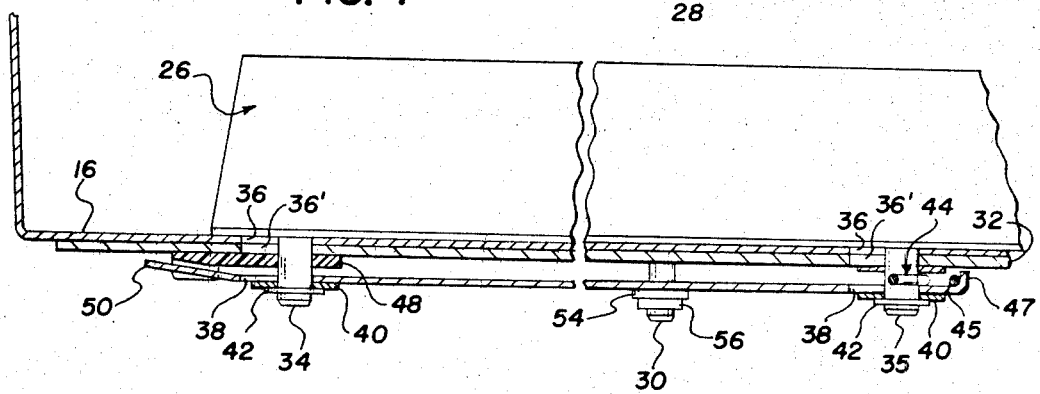
FIG. 5 is a side elevational view showing the apparatus in its released position.

Referring now to FIGS. 2 and 3, a pair of receiving brackets 27 is mounted below the receiving shelf 16 as shown. The brackets 27 have lateral projections 28 with transverse elongated slots 29 formed therein. Pins 30 which are secured to a support member 32 extend respectively through slots 29. A washer 54 and lock ring 56 at the lower end of each of the pins 30 secures the brackets 27 against downward movement on the pins 30. The slots 29 and pins 30 cooperate to permit the brackets 27 to slide transversely with respect to the receiving shelf 16 when the lateral position of the side guides 26 is adjusted as explained in detail below. As best seen in FIGS. 3, 4 and 5, a pair of pins or lugs 34 and 35 secured to each of the side guides 26 extends downwardly through aligned transverse elongated slots 36, 36' formed respectively in the receiving shelf 16 and the support member 32 and through longitudinal slots 38 formed in the brackets 27. Each of the pins 34 and 35 carries at its lower end a washer 40 and a lock ring 42 which secure the brackets 27 against downward movement on the pins 34 and 35.

The side guides 26 are individually biased rearwardly or to the left as viewed in FIGS. 2-5 by a pair of generally U-shaped leg springs 44. Each spring 44 has one leg 45 abutting an upturned end portion 47 of a receiving bracket 27 and the opposite leg 46 abutting a pin 35. The force applied to the pins 35 by the springs 44 urges the side guides 26 to a normally braked position shown in FIG. 3 in which a wedge-shaped brake pad 48 secured to each of the pins 34 is wedged against a mating wedge-shaped member 50 formed at an end of each receiving bracket 27.

To release the brake pads 48 from engagement with the wedge-shaped members 50 of the receiving brackets 27, the side guides 26 are manually pushed forwardly or to the right as viewed in FIGS. 2-5 against the bias of the springs 44. The forward movement of the side guides 26 causes the pins 34 and 35 to move across the width of the transverse elongated slots 36 and 36' formed in the receiving shelf 16 and support member 32, respectively, and along the length of the longitudinal slots 38 formed in the receiving brackets 27. The forward movement of the side guides also causes the brake pads 48 secured to the pins 34 and the legs 46 of the springs 44 abutting the pins 35 to move from the braked position shown in FIG. 3 to the released position shown in FIG. 5. The forward movement of one side guide 26 and the resulting movements of a pin 34 and brake pad 48 and a pin 35 and leg 46 of a spring 44 are illustrated in FIG. 4. In this Figure, both the braked and released positions of the pin 34 and brake pad 48 are shown in phantom and the braked position of the pin 35 and leg 46 of the spring 44 is shown in solid lines and the released positions in phantom.

When the side guides 26 are held in the released position shown in FIG. 5, they are free to move laterally across the receiving shelf 16 as the pins 34 and 35 move along the length of the transverse elongated slots 36 and 36' formed in the receiving shelf 16 and support member 32. The pins 34 and 35 move the receiving brackets 27 laterally with the side guides 26 as the pins 30 secured to the support member 32 move along the length of transverse elongated slots 29 formed in the bracket projections 28. When the side guides 26 are released by the operator, the resilient force of the springs 44 returns the side guides to the position shown in FIG. 3 thus braking the guides as positioned.

From the foregoing, the advantages of the present invention are readily apparent. Novel apparatus has been disclosed which permits the operator to adjust the side guides 26 with a simple push and slide movement. The guides 26 are individually adjustable to accommodate off-center document feeding. If on-center feeding is desired the side guides 26 may be preset to the desired width by aligning the inside edge of the side guides 26 with document width scale lines 52 visible on the receiving shelf 16.

The invention has been described in detail with reference to a preferred embodiment thereof but it will be understood that variations and modifications can be effected within the spirit and scope of the invention. For example, the springs 44 could bias the side guides 26 rearwardly by abutting against the pins 34 in which case the pins 35 could be eliminated. Further, the described wedging action could be achieved with brake pads 48 and members 50 of different shape or by other equivalent apparatus.

I claim:

1. Sheet guiding apparatus comprising:
    a. a receiving shelf for supporting a stack of sheets, said receiving shelf having a support surface with opposite longitudinal end portions and opposite lateral side portions there around and including elongated slot means extending inwardly from said side portions;
    b. a pair of upstanding side guides seated on said opposite side portions of said receiving shelf and spaced to receive the stack of sheets therebetween, each of said side guides having at least one lug member extending downwardly through said slot means, said lug members being movable in said slot means longitudinally with respect to said receiving shelf in first and second directions and movable laterally with respect to said receiving shelf in third and fourth directions;
    c. means for restraining said side guides against lateral movement in response to movement of said side guides in said first direction to a stop position; and
    d. means for resiliently biasing said lug members and said side guides for movement in said first direction into said stop position.

2. In a copying machine having a sheet transport device including a receiving shelf having a support surface with opposite longitudinal end portions and opposite lateral side portions there around for supporting a stack of sheets, adjustable sheet guiding apparatus comprising:
    a. first and second upstanding side guides seated on the opposite side portions of the receiving shelf;
    b. first and second brackets corresponding to said first and second side guides, respectively, each of said brackets having at least one longitudinal slot therein;

c. means for mounting said brackets on the underside of the receiving shelf for movement laterally thereof;
d. a lug mounted on each of said side guides, said lugs extending downwardly through transverse slots in the receiving shelf and through the longitudinal slots in said corresponding brackets to enable said side guides to move longitudinally with respect to said receiving shelf in first and second directions and to enable said side guides and said brackets to move laterally with respect to said receiving shelf in third and fourth directions;
e. abutment surfaces mounted and disposed on each of said side guides and said brackets so that said surfaces are wedged against one another when said side guides are moved in said first direction; and
f. means for resiliently biasing said side guides for movement in said first direction.

3. Sheet guiding apparatus as claimed in claim 2 wherein said first and second brackets are mounted on said receiving shelf so that the longitudinal slots therein are aligned with the transverse slots in the receiving shelf.

4. Sheet guiding apparatus as claimed in claim 2 wherein said means for mounting said first and second brackets on said receiving shelf includes:
a projection on each of said brackets extending laterally across said receiving shelf, said projections having transverse elongated slots therein; and
securing pins mounted on said receiving shelf, said pins extending downwardly through the transverse slots in said projections.

5. Individually adjustable side guide apparatus for use in a document transport device, said apparatus comprising:
a. a receiving shelf, said receiving shelf having a support surface with opposite longitudinal end portions and opposite lateral side portions there around and including first and second transverse elongated slots therein;
b. first and second upstanding side guides seated on said opposite side portions of said receiving shelf and adapted to receive a stack of documents therebetween;
c. first and second brackets corresponding to said first and second side guides, respectively, each of said brackets having at least one longitudinal slot therein and including a wedge-shaped portion at one end thereof;
d. means for mounting said first and second brackets on the underside of said receiving shelf for movement laterally thereof; said first and second brackets being positioned so that the longitudinal slots therein are aligned with the first and second transverse slots, respectively, in said receiving shelf,
e. first and second lugs secured to said first and second side guides respectively, said first and second lugs extending downwardly through the first and second transverse slots in said receiving shelf and through the longitudinal slots in said first and second brackets, respectively, to enable said side guides to move longitudinally with respect to said receiving shelf in first and second directions and to enable said side guides and said brackets to move laterally with respect to said receiving shelf in third and fourth directions;
f. a wedge-shaped brake pad secured to each of said first and second lugs; and
g. means for resiliently biasing said side guides for movement in said first direction so that said wedge-shaped portions of said brackets and said brake pads are wedged against one another.

6. Sheet guide apparatus as claimed in claim 5, wherein each of said brackets has first and second longitudinal slots therein; said first and second longitudinal slots being aligned with said first and second transverse elongated slots, respectively, in said receiving shelf.

7. Sheet guiding apparatus comprising:
a. a sheet support surface;
b. a pair of sheet guide members;
c. means for supporting said sheet guide members for movement laterally and longitudinally on said support surface;
d. means for retaining said sheet guide members against lateral movement in a first longitudinal position; and
e. means for biasing said sheet guide members towards said first longitudinal position, whereby said sheet guide members can be adjusted to any desired lateral position on said support surface by moving said side guides to a second longitudinal position against the force of said biasing means to release said side guides from said retaining means and then moving said side guides laterally along said support surface to the desired lateral positions, said side guides being returned to said first longitudinal position by said biasing means upon release from external force.

* * * * *